Figure 2:
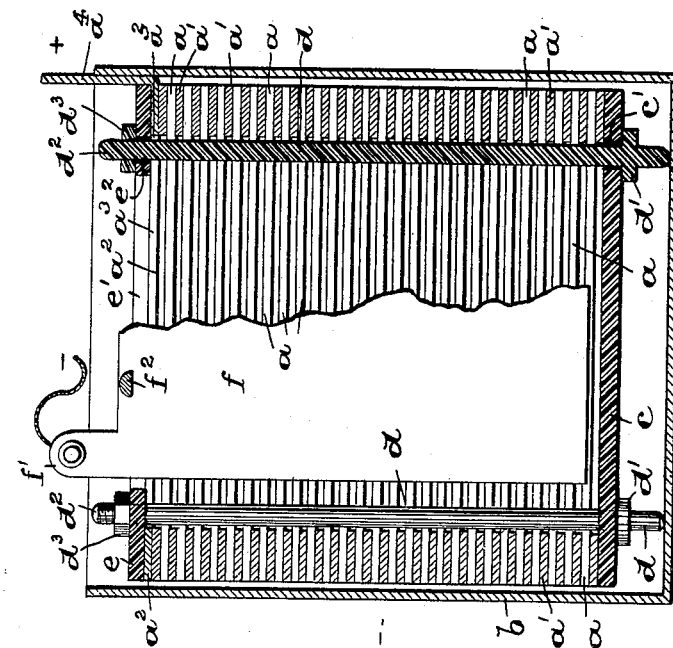

No. 660,375. Patented Oct. 23, 1900.
F. K. IRVING.
ELECTRIC BATTERY.
(Application filed Mar. 19, 1900.)

(No Model.) 2 Sheets—Sheet 1.

WITNESSES:
W. B. Fraentzel
Geo. D. Richards

INVENTOR:
FRANK K. IRVING
BY
Fred C. Fraentzel,
ATTORNEY

No. 660,375. Patented Oct. 23, 1900.
F. K. IRVING.
ELECTRIC BATTERY.
(Application filed Mar. 19, 1900.)
(No Model.) 2 Sheets—Sheet 2.
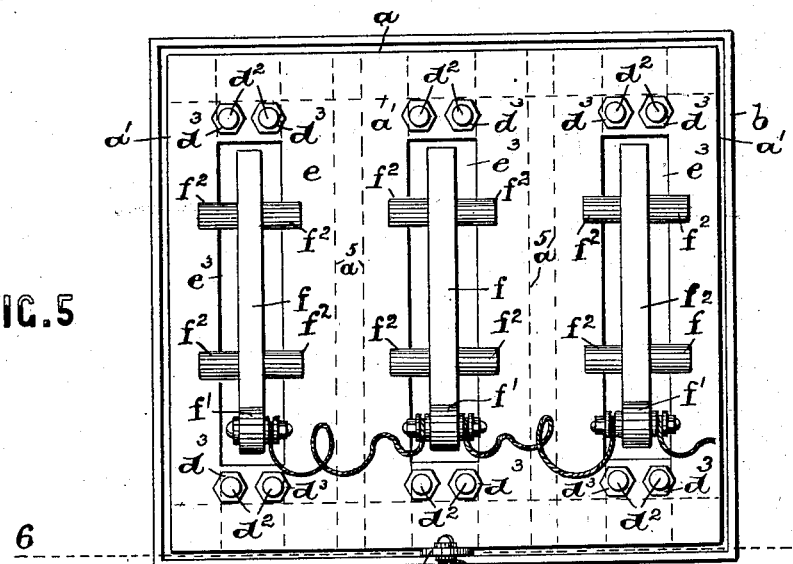
FIG. 5
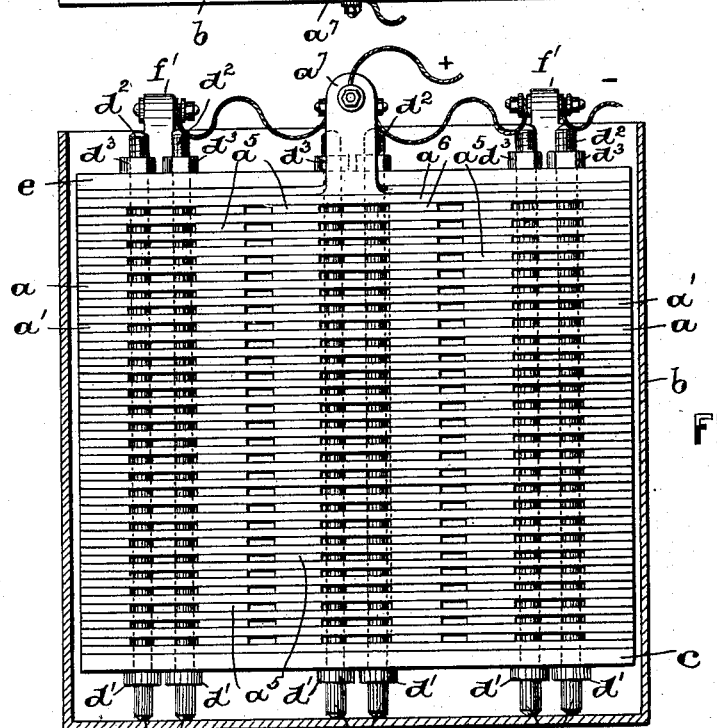
FIG. 6
FIG. 7
WITNESSES:
A. B. Fraentzel
Geo. D. Richards
INVENTOR:
FRANK K. IRVING
BY Frank K. Fraentzel,
ATTORNEY

UNITED STATES PATENT OFFICE.

FRANK K. IRVING, OF NEWARK, NEW JERSEY, ASSIGNOR OF ONE-HALF TO ANDREW G. VOGT, OF SAME PLACE.

ELECTRIC BATTERY.

SPECIFICATION forming part of Letters Patent No. 660,375, dated October 23, 1900.

Application filed March 19, 1900. Serial No. 9,193. (No model.)

*To all whom it may concern:*

Be it known that I, FRANK K. IRVING, a citizen of the United States, residing at Newark, in the county of Essex and State of New Jersey, have invented certain new and useful Improvements in Electric Batteries; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention refers to improvements in electric batteries, and has for its primary objects the production of a battery of a simple construction and one in which compensation for expansion and contraction is fully attained, and, furthermore, providing a battery of high efficiency, the negative elements being arranged in strips or bands upon each other in the "log-cabin" fashion to form a hollow square or rectangular open space between them, thereby providing large area in square feet for the action of the exciting liquid or electrolye for a minimum area in space in square inches occupied by said strips in the cell of the battery.

A further object of the invention is to build up the negative element of the battery of a suitable number of narrow and thin strips or bands to form at the ends of the square or rectangular or other built-up arrangement of said strips or bands solid end conductors, with spaces between the several strips or bands for the collection of the peroxid or "active" material, which acts upon or is acted upon by the exciting liquid or electrolyte having free access into the spaces thus provided.

The invention therefore consists in the novel construction of element embodying the features above set forth, and, furthermore, in the novel manner of connecting the several strips or bands together to form a negative element having an open space in the center for the arrangement therein of the positive element.

My invention consists also in the arrangement and combination, with a cell or casing, of an element made up of sectional plates or bands laid log-cabin fashion upon each other adjacent to the inner surfaces of the surrounding walls of the cell and providing a central open space in which is arranged the element of opposite polarity.

The invention consists, further, in the several novel arrangements and combinations of the various parts, as well as in the details of the construction thereof, all of which will be hereinafter fully described, and finally embodied in the clauses of the claim, which form a part of this specification.

The invention is fully illustrated in the accompanying drawings, in which—

Figure 4:
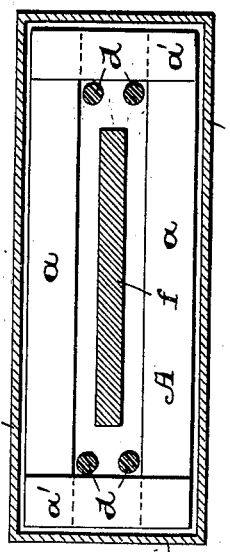
Figure 1:
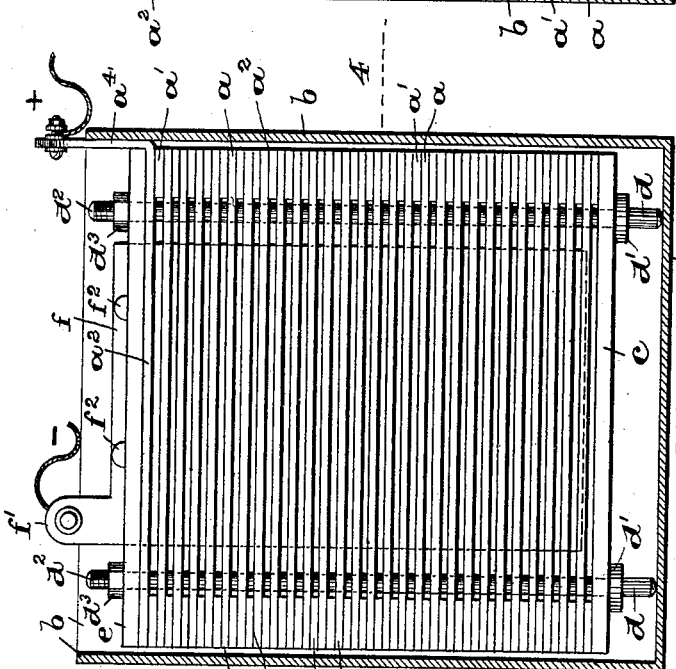
Figure 3:
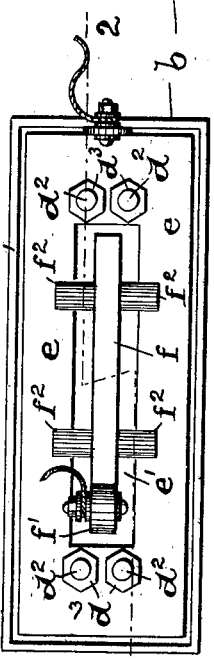

Figure 1 is a vertical section of a cell or casing, illustrating in elevation therein one arrangement of the negative and positive elements of the battery according to the principles of this invention; and Fig. 2 is a longitudinal vertical section of the cell and the elements, said section being represented on a line 2 2 in Fig. 3 of the drawings. Fig. 3 is a plan or top view of the battery; and Fig. 4 is a horizontal section of the same, taken on line 4 4 in Fig. 1. Fig. 5 is a top or plan view of a battery of a modified arrangement of the elements, but still embodying the features of this invention. Fig. 6 is a vertical section of the cell and a front elevation of the elements of said construction of battery, and Fig. 7 is a vertical detail section of a few of the strips or bands of the negative element and an upper plate of a non-conducting material.

Similar letters of reference are employed in all of the said above-described views to indicate corresponding parts.

Referring to the said drawings, *b* indicates a suitably-constructed cell, which may be of any desirable shape in outline and may be of any suitable material.

In Figs. 1 to 4, inclusive, I have indicated the complete negative element, in the present case being built up in log-cabin fashion by an arrangement of longitudinally-placed strips or bands *a* and intermediately-placed and lateral strips or bands *a'*, the same in this case forming a rectangular pile of strips or bands the respective ends of which rest one upon the other at the four corners of the rectangle, and thus providing the solid or continuous conductors at said corners, as clearly represented in the several figures of the drawings. Of course it will be understood that this arrangement of strips or bands $a$ and $a'$ may be changed so as to form a hollow square, or the strips may be placed to form a geometrical figure of any number of sides, as will be clearly evident. As will be seen more especially from Figs. 1, 2, and 3, this pile of strips or bands $a$ and $a'$ is placed upon a base or plate $c$, of a non-conducting material, which is suitably perforated, as at $c'$, (see Fig. 2,) and rests upon the shoulders $d'$ or other suitable supporting means at or near the lower portions of vertically-arranged rods or posts $d$, substantially as shown. The said rods are also made of a non-conducting material, such as hard rubber or the like.

Upon the uppermost strips or bands $a'$ of the negative element A may be arranged a plate $a^2$ of the same material as the strips $a$ and $a'$, said plate being formed with a central opening $a^3$, which corresponds to the open space formed by the piled or built-up strips or bands $a$ and $a'$, and said plate $a^2$ having a suitable post or arm, as $a^4$, which provides the positive pole of the battery. Resting directly upon the top of said upper plate $a^2$ is another plate $e$, made of a non-conducting material, as hard rubber or the like. Said plate $e$ is preferably provided with the central opening $e'$, made smaller than the opening $a^3$ in the plate $a^2$ and being provided with holes or perforations, as $e^2$, (see Fig. 2,) through which the screw-threaded ends $d^2$ of said rods $d$ are passed, and the several parts of the element A then being securely connected and held together by nuts $d^3$ on said ends $d^2$ of the rods $d$ and the shoulders $d'$ or other supporting means at the lower ends of said rods.

Within the open space formed by the surrounding strips $a$ and $a'$ of the negative element A in the manner just set forth is arranged a plate $f$ of zinc or other suitable material, forming the positive element of the battery and provided with the usual lug $f'$, forming the negative pole of the battery. Said plate $f$ may be provided with suitable lugs or projections $f^2$ for supporting the plate in position by suspending it in the manner shown in the opening of the plate $e$; but of course it will be understood that said positive element may otherwise be held in its operative position in the space formed by the surrounding strips or bands $a$ and $a'$ of the negative electrode of the battery.

The negative element A of the battery may be made of any desirable metal; but I prefer to use strips or bands $a$ and $a'$, consisting of a composition of matter containing lead, zinc, and mercury.

In carrying out my invention the above composition of matter or alloy is prepared by first taking five pounds of lead-shavings or the like and twelve ounces of mercury, the same being mixed and then melted together and allowed to cool. After this molten mass has cooled sufficiently the compound is broken up and mixed with zinc in the proportion of one part of zinc to six parts of the lead and mercury compound and the whole matter melted. The resultant alloy can then be cast, rolled, molded, or pressed into the shape herein set forth.

From the above statement one might suppose that the mercury having a low point of volatilization would pass off before the other metals melt; but such is not the case where the several metals are mixed in the manner herein set forth. The above mixture also enables me to combine more of the zinc with the lead, which ordinarily would take up only a trace of the zinc in melting and leave the rest floating upon the molten surface of the lead.

By the employment of this preferred composition of matter or alloy I am enabled to produce a battery-electrode which has the following action: When the negative element A, made as herein described, is immersed in a solution of sulfuric acid, together with the element of opposite polarity, upon the introduction of the charging-current the zinc and mercury, being transferable by electrolysis and also being soluble in the solution of sulfuric acid, are deposited or plated upon the positive plate. The electrolytic oxygen attacks the remaining porous-lead strips or bands and peroxid of lead is formed. Thus by the dissolution of the alloy strips I have a spongy-lead strip left, and I deposit the metal necessary to form the opposite pole therefrom, producing a lead-peroxid-zinc-mercury alloy combination, which will produce an efficient electromotive force of several volts.

As has been stated in the above, the strips or bands $a$ and $a'$ may be variously arranged. Such other arrangement is represented in Figs. 5, 6, and 7, which is especially applicable in large cells. In this construction of battery I employ, in addition to the longitudinal strips or bands $a$ and the lateral end strips $a'$, other lateral strips or bands $a^5$ and an upper plate $a^6$, made in the manner of the plate $a^4$, described in connection with Figs. 1 to 4, inclusive. This plate $a^6$ has an arm or post $a^7$, which forms the positive pole of this form of battery. In this construction in place of four supporting and connecting rods $d$ I may employ six or more or less rods, as may be found necessary to produce rigidity of the parts, and the insulating-plate $f$ may be provided with two, three, or more openings, as $e^3$, in which I have arranged a corresponding number of positive elements $f$, which are connected in series, as clearly illustrated. It will be readily seen, therefore, that the number of positive elements and their manner of arranging them in the spaces formed by the log-cabin arrangement of the strips or bands of metal of the negative element may be changed, and the arrangement of said strips or bands may also be departed from without changing the scope of my present invention. Hence I do not limit my invention to the exact arrangements and combinations of these several parts, nor do I confine myself to the details of the construction thereof, nor to the exact composition of matter or alloy of the electrodes of the battery.

Having thus described my invention, what I claim is—

1. A battery-electrode consisting of metallic strips or bands, arranged upon each other "log-cabin" fashion, and forming a central open space, substantially as and for the purposes set forth.

2. A battery-electrode consisting of metallic strips or bands, arranged upon each other "log-cabin" fashion, and forming a central open space, said strips having contacting portions forming solid conductors, and intermediate spaces between their non-contacting portions, substantially as and for the purposes set forth.

3. A battery-electrode consisting of longitudinally-arranged metallic strips or bands and intermediately-placed lateral strips or bands, arranged "log-cabin" fashion and forming a central open space, substantially as and for the purposes set forth.

4. A battery-electrode consisting of longitudinally-arranged metallic strips or bands and intermediately-placed lateral strips or bands, arranged "log-cabin" fashion and forming a central open space, said strips having contacting portions forming solid conductors, and intermediate spaces between their non-contacting portions, substantially as and for the purposes set forth.

5. A battery-electrode consisting of a lower and an upper supporting-plate, both of a non-conducting material, and metallic strips or bands between said plates, arranged upon each other "log-cabin" fashion, and forming a central open space, and connecting rods or bolts operatively connecting said upper and lower plates and said strips or bands, substantially as and for the purposes set forth.

6. A battery-electrode consisting of a lower and an upper supporting-plate, both of a non-conducting material, and metallic strips or bands between said plates, arranged upon each other "log-cabin" fashion, and forming a central open space, and connecting rods or bolts operatively connecting said upper and lower plates and said strips or bands, said strips or bands having contacting portions forming solid conductors, and intermediate spaces between their non-contacting portions, substantially as and for the purposes set forth.

7. A battery-electrode consisting of a lower and an upper supporting-plate of a non-conducting material, said upper plate having a central opening, longitudinally-arranged metallic strips or bands and intermediately-placed lateral strips or bands, arranged "log-cabin" fashion and forming a central open space, and connecting rods or bolts operatively connecting said upper and lower plates and said strips or bands, substantially as and for the purposes set forth.

8. A battery-electrode consisting of a lower and an upper supporting-plate of a non-conducting material, said upper plate having a central opening, longitudinally-arranged metallic strips or bands and intermediately-placed lateral strips or bands, arranged "log-cabin" fashion and forming a central open space, and connecting rods or bolts operatively connecting said upper and lower plates and said strips or bands, said strips having contacting portions forming solid conductors, and intermediate spaces between their non-contacting portions, substantially as and for the purposes set forth.

9. In an electric battery, a negative electrode, consisting, essentially, of metallic strips or bands arranged upon each other "log-cabin" fashion, and forming an open space, and a positive electrode in said open space, substantially as and for the purposes set forth.

10. In an electric battery, a negative electrode, consisting, essentially, of metallic strips or bands arranged upon each other "log-cabin" fashion, and forming a central space, said strips having contacting portions forming solid connections, and intermediate spaces between their non-contacting portions, and a positive electrode in said central open space, substantially as and for the purposes set forth.

11. In an electric battery, a negative electrode, consisting, essentially, of longitudinally-arranged metallic strips or bands and intermediately-placed lateral strips or bands, arranged "log-cabin" fashion and forming a central open space, and a positive electrode in said space, substantially as and for the purposes set forth.

12. In an electric battery, a negative electrode, consisting, essentially, of longitudinally-arranged metallic strips or bands and intermediately-placed lateral strips or bands, arranged "log-cabin" fashion and forming a central open space, and a positive electrode in said space, said strips having contacting portions forming solid conductors, and intermediate spaces between their non-contacting portions, and a positive electrode in said central open space, substantially as and for the purposes set forth.

13. In an electric battery, a negative electrode, consisting, essentially, of a lower and an upper plate, both plates of a non-conducting material, and metallic strips or bands between said plates, arranged upon each other "log-cabin" fashion, and forming an open space, connecting rods or bolts operatively connecting said upper and lower plates and said strips or bands, and a positive electrode in said central open space, substantially as and for the purposes set forth.

14. In an electric battery, a negative electrode, consisting, essentially, of a lower and an upper plate, both plates of a non-conducting material, and metallic strips or bands between said plates, arranged upon each other "log-cabin" fashion, and forming an open space, connecting rods or bolts operatively connecting said upper and lower plates and said strips or bands, said strips or bands having contacting portions forming solid conductors, and intermediate spaces between their non-contacting portions, and a positive electrode in said central open space, substantially as and for the purposes set forth.

15. In an electric battery, a negative electrode, consisting, essentially, of a lower and an upper supporting-plate of a non-conducting material, said upper plate having a central opening, longitudinally-arranged metallic strips or bands and intermediately-placed strips or bands, arranged "log-cabin" fashion and forming a main central open space, connecting rods or bolts operatively connecting said upper and lower plates and said strips or bands, and a positive electrode in said main central open space, substantially as and for the purposes set forth.

16. In an electric battery, a negative electrode, consisting, essentially, of a lower and an upper supporting-plate of a non-conducting material, said upper plate having a central opening, longitudinally-arranged metallic strips or bands and intermediately-placed strips or bands, arranged "log-cabin" fashion and forming a main central open space, connecting rods or bolts operatively connecting said upper and lower plates and said strips or bands, said strips or bands having contacting portions forming solid conductors, and intermediate spaces between their non-contacting portions, and a positive electrode in said main central open space, substantially as and for the purposes set forth.

In testimony that I claim the invention set forth above I have hereunto set my hand this 14th day of March, 1900.

FRANK K. IRVING.

Witnesses:
FREDK. C. FRAENTZEL,
GEO. D. RICHARDS.